UNITED STATES PATENT OFFICE.

CARL HENRICH, OF LINCOLN COUNTY, GEORGIA, ASSIGNOR TO FLUORIDE MFG. CO., OF FARMINGDALE, NEW YORK, A CORPORATION OF NEW YORK.

COMPOSITION OF MATTER.

1,116,063.  Specification of Letters Patent.  Patented Nov. 3, 1914.

No Drawing.  Application filed April 24, 1913.  Serial No. 763,333.

*To all whom it may concern:*

Be it known that I, CARL HENRICH, a citizen of the United States, and a resident of the county of Lincoln and State of Georgia, have invented a new and improved Composition of Matter to be used as a fire and water proof covering in painting wood, lumber, shingles, canvas, or other inflammable articles to render the same flame-resisting and fireproof in a high degree and also waterproof, of which the following is a full, clear, and exact description.

The composition consists in the following ingredients, combined in about the proportion stated, namely: magnesia or calcined dolomite, fifty-two per cent.; calcium sulfate, dried, twenty-one and eight-tenths per cent.; dextrin, one per cent.; anhydrous sulfate of magnesium, twenty-five per cent.; bichromate of potassium, two-tenths of one per cent.

The above-mentioned ingredients are thoroughly mingled and mixed together while in a dry state, to form an impalpable powder which can be readily put up in cans or bags so as to be ready for use whenever desired, the composition keeping unaltered for any reasonable length of time.

When it is desired to use the composition as a paint or covering the above ingredients are intimately mixed with about thirty per cent. of water to form a liquid mixture which can be readily spread and put onto the article with a brush or a spraying apparatus.

It is well known that the difficulty and expense incurred in shipping an ordinary liquid paint is a serious obstacle to the more general use of such paint. The composition above described is very light in comparison with ordinary liquid paint to reduce expense in shipping.

It will be noticed that the ingredients can be readily mixed with water whenever it is desired to use the composition as a paint or a covering, and this mixture can be readily applied to form a fireproof and waterproof paint or covering which is exceedingly durable and which presents a fine appearance. The composition can be readily combined with any coloring matter, either mineral or vegetable, to obtain the desired shade in the tint required.

Having thus described my invention, I claim as new and desire to secure by Letters Patent:

1. The herein described composition of matter to be used as a paint or covering, which consists of a fluid mixture comprising magnesia, anhydrous magnesium sulfate, calcium sulfate, dextrin, bichromate of potassium, coloring matter and water, said mixture forming when dry a fire proof, waterproof, and durable covering, substantially as described.

2. The herein described composition of matter, consisting of magnesia 52 per cent., anhydrous magnesia sulfate 25 per cent., calcium sulfate 21.8 per cent., dextrin 1 per cent., bichromate of potassium 0.2 per cent., water 30 per cent., and suitable coloring matter.

In testimony whereof I have signed my name to this specification in the presence of two subscribing witnesses.

CARL HENRICH.

Witnesses:
  LOUIS EWRICHT, Jr.,
  A. N. HOPKINS.

Copies of this patent may be obtained for five cents each, by addressing the "Commissioner of Patents, Washington, D. C."